Feb. 8, 1966 J. W. ANDERSON 3,233,273
WINDSHIELD WIPER BLADE
Original Filed Nov. 14, 1957 2 Sheets-Sheet 1
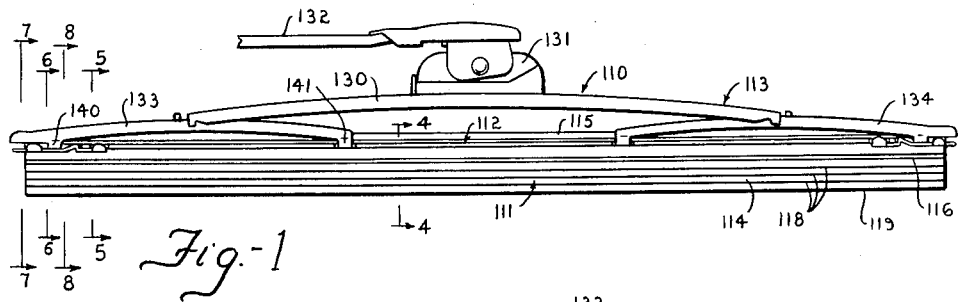
Fig.-1
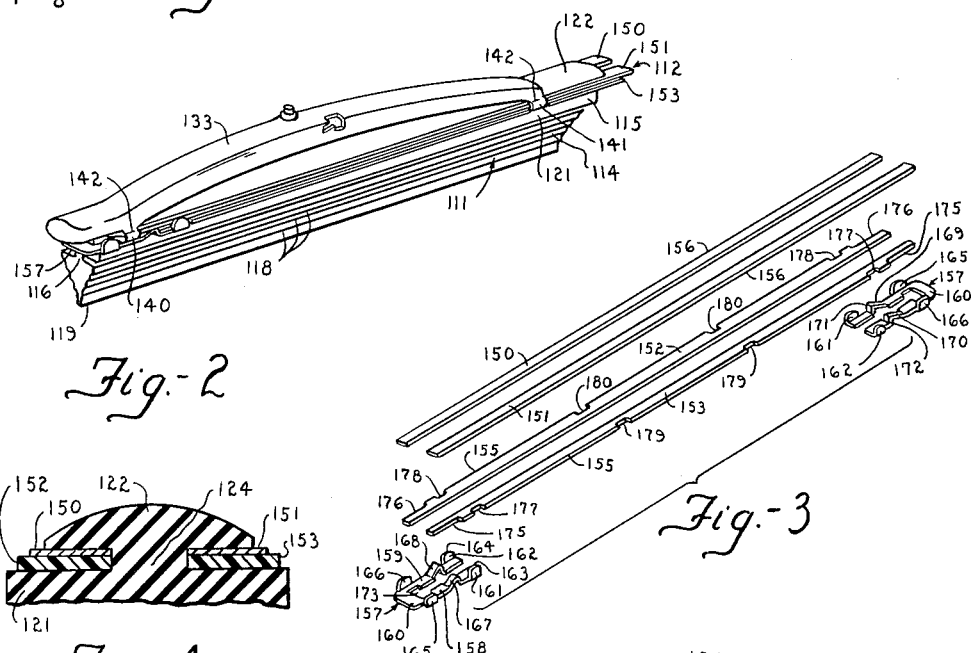
Fig.-2
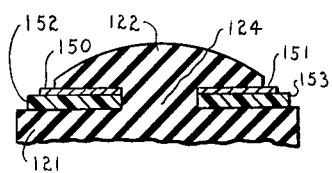
Fig.-4
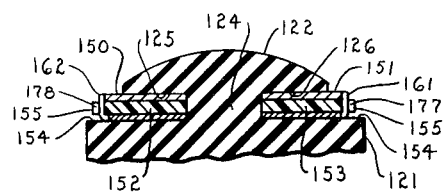
Fig.-5
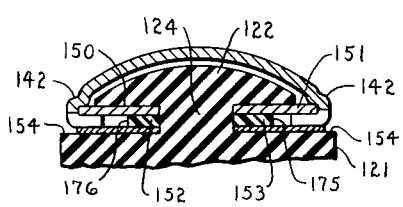
Fig.-6
Fig.-3
INVENTOR.
JOHN W. ANDERSON

INVENTOR.
JOHN W. ANDERSON

# United States Patent Office 3,233,273
Patented Feb. 8, 1966

3,233,273
WINDSHIELD WIPER BLADE
John W. Anderson, Gary, Ind.
Continuation of application Ser. No. 696,444, Nov. 14, 1957. This application Feb. 26, 1962, Ser. No. 175,897
8 Claims. (Cl. 15—250.42)

This is a continuation of my copending application Serial No. 696,444, filed November 14, 1957, and now abandoned, which was a continuation-in-part of application Serial No. 648,270, now U.S. Patent No. 3,041,654.

This invention relates to windshield or window wipers and more particularly to an improved wiper for wiping a curved or commercial "flat" surface of a windshield or window.

Just prior to the introduction of curved glass windshields in automobiles, there was invented primarily to meet the then presented need for a blade to wipe the curved windshield of a military airplane, a novel wiper blade which played a large part in making it possible to satisfactorily use curved windshield in automobiles. Because of the improved wiping action obtained by that blade, it met with immediate commercial success and was universally adopted to the cleaning of curved glass windshields upon their introduction by the automobile industry. This blade includes a pressure-distributing assembly for applying the wiper arm pressure to the wiping blade through flexor means that is freely and resiliently flexible when applied to the surface to be cleaned, but is substantially inflexible in a plane generally parallel to that surface. When using this combination of elements, a predetermined proportion of pressure is supplied to each of a plurality of spaced-apart points on the blade so as to cause the blade to conform to the normally irregular surface of a windshield being wiped.

In a common commercial form of that prior art invention, the wiper arm is connected to the center point of a primary bridge element and the ends of the bridge are pivotally connected to secondary yoke means. The secondary yokes in turn are connected at spaced points along a freely flexible flat flexor means, so that the pressure from the primary bridge is distributed through the secondary yokes to the several pressure points along the flexor means where the secondary yokes are operatively connected with the flexor means.

In the most common adaptation of this form of wiper blade, the flexor means has taken the form of a flat resilient preferably metal means which is flexible in a direction toward the windshield to conform to the contour of the curved glass being wiped, but which is substantially inflexible in a direction parallel to the surface of the glass so that the pressure of the wiper arm can be distributed through the bridge and yoke system to the flexor means. The flexor means thus stiffens the rubber wiping element laterally, but flexes with the rubber toward and away from the surface being wiped.

It has been determined in practice that whenever elongate side portions or flexors of the flexor means or backing in a blade of this general type, for example as shown in my U.S. Patent No. 2,596,063, are connected together against substantial relative longitudinal movement, as by metallic end clips or as in a one-piece construction, the cramping or buckling of one of the side portions or strips, as when the blade travels over the relatively abrupt curvatures adjacent the sides of the more extreme types of wrap-around windshields more recently encountered, the strain created by the cramp or buckle is "telegraphed" to the opposite side portion or strip of the flexor means with the result that it is deformed and is retarded in the performance of its intended function so that the ability of the rubber to conform effectively to the glass is impaired, or creates within the structure an imbalance of distribution of arm pressure which leaves portions of the wiping edge deficient in pressure and predisposed to windlift, often affecting areas of the windshield through which it is most important that vision be maintained.

Another influence that tends to retard the free movement of the flexor means toward fullest conformity of the wiping edge of the rubber to the curvature of the windshield is the friction encountered by the lower surface of the flexor means as it is pressed against the rubber by the distributed pressure of the wiper arm. It has, therefore, been found desirable to introduce, as part of the flexor means, antifriction means, preferably in the form of a filler disposed between the flexor and the rubber and having a different and nonmatching surface structure to produce a lower frictional resistance than occurs when a flexor directly contacts the wiper element, in order that the blade may more readily yield to the distribution of pressure of the wiper arm and thence produce more effective conformity of the wiper element to the curvatures of the glass.

Blades of the subject type are used to advantage on a great variety of windshields mounted in a great variety of models and makes of automobiles, ranging from the cheapest to the most costly. Windshields to be wiped range from the old style so-called flat windshields to the newer type of curved windshields moving toward general use in about 1947 models of automobiles, and the so-called panoramic or "wrap-around" windshields coming into use in more recent years and now projected for practically all American-made cars.

Of course so-called curved windshields, wrap-around windshields, and panoramic windshields are all in the general class of curved windshields. The trend has been for the curvature toward the sides of the windshields to become more abrupt, and of shorter radius, at the area where the surface begins to change toward a closer approximation of alignment with the sides of the body of the car. Such extreme curvatures require a wiper element more readily flexible, to permit curvature through a greater distance, to attain effective conformity with all portions of the surface of the glass within the pattern to be wiped.

To attain such a result on such extremely curved windshields, it becomes desirable to relieve the contact between the pressure-distributing device and the flexor means, as well as the contact between the flexor means and the surfaces through which it transmits pressure through the rubberlike wiping element of the wiping portions thereof, so that a minimum of friction is encountered in that contact, thus to facilitate flexing of the blade and conformity to the windshield.

Thus, in the subject invention there is presented wholly novel features having high utility contributing to the achievement of the critical task of wiping irregular surfaces as of a curved windshield uniformly and clearly.

Each flexor of the flexor means is "full floating" and is unrestrained by any rigid or firm connection with any other component. Thus, each flexor is free to reversingly move or creep within practicable limits with relation to the other flexor and with relation to the wiping element, as well as with relation to the antifriction strip or filler, while the contacting portions of the pressure-distributing assembly slidingly distribute the pressure of the wiper arm to spaced-apart portions of the flexor means, as the blade moves across varying curvatures of the glass.

It is, therefore, a principal object of this invention to provide a windshield wiper blade assembly having improved means for substantially reducing the resistance to relative movement between the wiper element and the flexor means so that the wiping element responds more freely to pressure transmitted by the flexor means so that the wiping edge of the element is caused thereby to more readily conform to the surface being wiped.

More particularly, a principal object of the invention is to provide a windshield wiper blade assembly having a wiping element, with a flexible support means spaced from said element by means adapted to reduce frictional contact between said element and said support means.

It is also an important object of this invention to provide an improved windshield wiper blade assembly in which the flexors or members of the flexor means may more freely "float" reversingly relative to one another.

It is another important object of this invention to provide an improved wiper blade element having flexor means including antifriction members adapted to increase the flexibility of the blade.

It is a significant object of this invention to provide an improved wiper blade element that is more easily assembled with a pressure-distributing superstructure.

Also, it is another important object of this invention to provide an improved wiper element that is readily replacable in a wiper blade assembly.

An additional object of this invention is to provide an improved means for retaining the flexor members assembled in predetermined functional relationship with the wiper element.

Another important object of this invention is to provide an improved retaining means for the flexor means that will guide operative parts of the pressure-applying superstructure into correct alignment during assembly with the flexor means of the wiper element.

A further important object of this invention is to provide, for retaining the flexors or backing strips (support means) assembled in the blade, improved abutment means constructed and arranged to permit the embracing claws of the pressure-distributing superstructure to pass into or out of assembled relationship with respect to the wiper element.

A further object of this invention is to provide improved retainer means for a wiper blade that can be readily disposed to retain the flexor (support means) of the blade in operative relative positions without unduly limiting the freedom of movement of the flexor members or components relative to each other.

Another object of this invention is to provide an improved wiper blade assembly wherein the flexor means and the claws of the pressure-distributing superstructure are inset with respect to the wiping element that they cannot readily scratch or mar the windshield when moved thereacross.

And another object of this invention is to provide an improved windshield wiper blade that is more freely flexible in a plane substantially perpendicular to the surface being wiped.

A still further object of this invention is to provide an improved retaining means for the flexor members of the wiper element that will automatically direct operative parts of the pressure-applying superstructure into assembled positions.

Other objects and advantages of the invention will become evident when the description hereinafter set forth is considered in conjunction with the drawings annexed hereto.

FIGURE 1 is a side elevational view of a windshield wiper blade assembly embodying features of the present invention;

FIGURE 2 is an enlarged perspective view of one end portion of the embodiment of FIGURE 1;

FIGURE 3 is an exploded view of the flexor elements of my invention together with a preferred form of end clip for retaining the elements assembled with the blade;

FIGURE 4 is a cross-sectional view taken on the line 4—4 of FIGURE 1;

FIGURE 5 is a cross-sectional view taken on the line 5—5 of FIGURE 1;

FIGURE 6 is a cross-sectional view taken on the line 6—6 of FIGURE 1;

Figure 7:
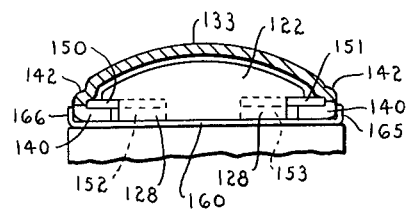
FIGURE 7 is a cross-sectional view taken on the line 7—7 of FIGURE 1.
Figure 8:
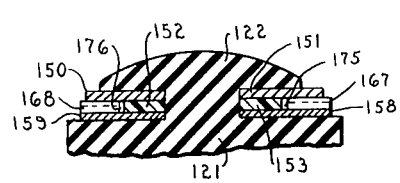
FIGURE 8 is a cross-sectional view taken on the line 8—8 of FIGURE 1.

The blade of this invention includes all of the elements of the basic invention described above including a wiping element, the flexor means and a pressure-applying yoke system cooperating with the flexor means and wiping means. Thus, as is well known, the usual wiper drive arm positioned in front of an automobile windshield is adapted to be connected to a connector 131 to transmit a driving motion and wiping pressure to a primary bridge element 110. The primary bridge is adapted to be detachably connected to the secondary yokes 133 and 134 by the releasable connection, as disclosed in FIGURE 6 of U.S. Patent No. 3,041,654 wherein each of the ends of the primary bridge 11 is provided with a pair of inwardly turned claws 14 and 15 which are adapted to straddle each of the secondary yokes 12 and 13 to pass downwardly into apertures 16 and 17 provided in the upper surface at approximately the center point of the respective secondary yokes.

In the form of the inventions described in U.S. Patent 3,041,654 it will be noted that the pressure derived from the wiper arm is transmitted to the pressure-distributing superstructure so the latter will distribute and apply pressure to the flexor means more or less through the resilient wiper element whereas in the invention exemplified in FIGURES 1 through 12 herein, the pressure is applied substantially directly to the flexor means, as will now be described.

The windshield wiper blade assembly 110, as illustrated in FIGURE 1, comprises a resilient wiper element 111, an elongate flexible support or flexor means 112 detachably secured thereto, and a pressure-distributing superstructure 113. The resilient wiper element 111 is composed of a wiper head portion 114 and an attaching or back portion 115 which are joined together by a relatively thin intermediate hinge portion 116 so that the wiping head portion may move laterally with respect to the back portion when the blade is moved back and forth across the windshield. The head portion has several outwardly extending edge portions 118 arranged in gradually tapered formation downwardly to a relatively thin wiping edge 119 adapted to contact a windshield for cleaning the surface thereof.

Figure 11:
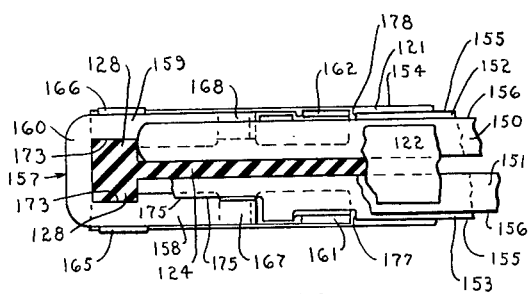
FIGURE 11 is a partial view of the blade with the rubber in section showing a retainer in an operative position.

The back portion 115 of the wiper element, as depicted in FIGURE 4, has a lower section 121 which is relatively thick in a vertical direction and joined to an upper section 122 by a web 124 running the full length of the wiper element to define a pair of matching grooves 125 and 126 extending inwardly from the opposite sides of the back portion. Abutments 128, as shown in FIGURE 11, are provided at the outer ends of the grooves. The elongate flexible support or flexor means 112 are disposed in the grooves between the abutments in a manner which will be described in greater detail hereinafter.

The pressure-distributing superstructure 113 can be of any one of the well-known types, but the form illustrated comprises a primary bridge 130 having a connector 131 thereon for attachment to the end of a wiper arm 132, A pair of secondary yokes 133, 134 are detachably connected to the end portions of the primary bridge 130 by means of releasable connections as described above in connection with the construction shown in FIGURE 6 of U.S. Patent No. 3,041,654.

The secondary yokes 133 and 134 are adapted to be connected to the elongate flexor means 112 carried by the wiper element 111 by means of inturned embracing claws 140, 141 formed on the end portions of the secondary yokes. The embracing claws 140, 141 engage around the lateral edges of the flexor means at longitudinally spaced points so as to distribute the pressure or force from the spring-loaded wiper arm 132 to the wiping edge of the blade to obtain conformance between the blade and the surface to be wiped.

The side portions of the secondary yokes 133, 134, in the vicinity of the claws 140, 141, are shaped to substantially conform and bear against the longitudinal edge portions of the flexor means, as illustrated at 142 in FIGURES 6 and 7. The engagement between the embracing claws and the flexor means 112 is such that the flexor means can slide longitudinally relatively freely with respect to the embracing claws when the blade is traversing a surface being wiped.

The flexor means 122, as described above, are positioned in the grooves 125 and 126 of the wiping element 111 for receiving at longitudinally spaced points pressure from the superstructure of the wiper assembly. The flexor means is designed and constructed to be substantially freely flexible throughout its length in a direction substantially perpendicular to the surface being wiped and substantially inflexible in a direction substantially parallel to said surface. The flexor means 112 is also constructed to provide abutment means so that lateral flexing of the blade and consequent "chattering" of the blade on the glass is avoided.

In order to promote flexibility of the wiping element in a plane vertical to the windshield, the flexor means 112 is preferably comprised of resiliently flexible backing members or elements 150 and 151 and antifriction contact members 152 and 153. The contact members 152, 153 of the flexor means 112 are preferably flexible and juxtaposed beneath the backing elements 150, 151, respectively, and are constructed and arranged to permit relative movement therebetween in such a manner that the wiping element more readily conforms to the surface to be wiped under the pressure transmitted to the flexor means by the superstructure of the blade with the maximum application of wiping force to the surface being wiped and a minimum of frictional resistance or loss within the blade itself due to the flexing action which takes place during operation of the wiper, all of which promotes conformity of the blade to the curvature of the windshield.

The flexible backing elements 150 and 151 of the flexor means 112 are preferably formed of flat striplike pieces of resilient material. The inner longitudinal edge portions of the backing elements 150 and 151 are respectively positioned in grooves 125, 126 and their outer longitudinal edge portions 156 are exposed and extend beyond the outer longitudinal edges of the upper section 122 of the back portion 115 of the wiping element.

The contact members 152 and 153 are preferably formed of a plastic material, but may be made of metal or other appropriate material. These members serve to space the backing members 150 and 151 from the bottom walls 154 of the grooves and provide antifriction bearing surfaces between the backing members and said bottom walls. This reduction in friction between the backing members 150 and 151 and the walls of the grooves 125, 126 permits the blade to flex more easily in conforming to an irregular surface to be wiped and very little, if any, energy is lost because of friction which would otherwise be present when different and/or corresponding surfaces of the attaching portion of the wiping element slide relative to the flexor means during the flexing action of the wiper blade.

In FIGURES 2 and 5, it will be noted that the longitudinal edge portions 155 of the contact members 152 and 153 extend laterally beyond the outer longitudinal edge portions 156 of the backing members 150 and 151. The lateral spacing of the edges of the contact members 152, 153 relative to the backing members 150, 151 will permit rapid and easy separation of the contact members from the backing members by pressing the overhanging edges of the contact members downwardly with respect to the backing members for a reason to be more fully explained hereinafter.

In order to retain the antifriction contact members 152, 153 in the grooves 125, 126 and beneath the backing members 150, 151 without restricting the freedom of movement of any one member relative to any of the other members, a pair of corresponding retainers generally designated 157 are carried by the end portions of the flexor means. These retainers, as will be described more fully subsequently, are adapted for attachment with the wiping element when the components of the flexor means are being assembled therewith.

Each of the retainers 157 is preferably made substantially flat and includes a U-shaped body portion having corresponding legs 158, 159 and a bridge 160 joining the legs. The inner ends of the legs 158, 159 are provided with upturned tabs or abutment means 161, 162 and the free ends of the tabs are respectively provided with convex surfaces 163, 164. The abutments or tabs on the retainers and the claws 140 on the yokes jointly serve to hold the flexor means in operative relation to the wiping element. The legs are also provided with a pair of guide members 165, 166 extending upwardly from the side edges of the legs in a manner similar to the tabs 161, 162 and in longitudinally spaced relationship therefrom. The guides 165, 166 are aligned with each other on opposite sides of the retainer and are joined to the bridge 160 thereof. The legs of each retainer are also provided with a pair of corresponding tracks or ramps 167, 168 disposed between the pair of tabs and guides. The tracks or ramps include portions inclined toward the inner ends of each retainer and depending walls 171, 172.

Figure 10:
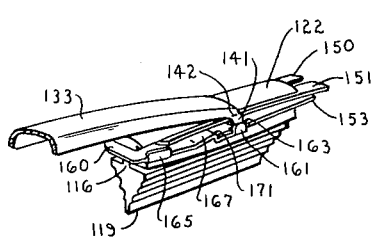
FIGURE 10 is a partial perspective end view showing the act of assembling a secondary yoke with the blade.

The legs 158, 159 of the retainers 157 adjacent the bridges 160 are undercut or notched at 173 to provide openings, as shown in FIGURES 10 and 18, so they will receive the abutments 128 and the inner longitudinal edge portions of the legs will nest in the grooves 125, 126 in order to assist in detachably holding the retainers assembled on the wiping element. The retainers 157 are applied to the wiping element by forcibly spreading their legs so they will pass over the abutments 128 whereupon the legs are released for entry into the grooves.

As clearly shown in FIGURE 3, the extremities of the contact members 152, 153 along their outer longitudinal edge portions are respectively provided with corresponding longitudinally spaced pairs of notches or slots 175 and 176, 177 and 178, and 179 and 180. The notches 175 and 176 are provided in the outer corners of the members for receiving the ramps 167, 168 and the claws 140 on the outer ends of the secondary yokes when the yokes are assembled therewith. The notches 177, 178 are adapted to receive the tabs or abutment means 161, 162 on the retainers 157, as depicted in FIGURES 5 and 11, and the notches 179, 180 receive the claws 141 on the inner ends of the yokes.

The flexor means 112 is preferably assembled with the wiping element by inserting the backing members 150, 151 and the contact members 152, 153 in the grooves in superimposed relationship, as shown, with the notches in the contact members facing outwardly. The ends of the flexor means or flexors 150, 151, 152, 153 may or may not abut the inner surfaces of the abutments 128 at the ends of the grooves 125, 126, so as to control, within practicable limits, relative longitudinal movement between the flexor components and the wiping elements. After the flexor components are disposed in the grooves, the retainers 157 are fitted around the abutments 128 in the manner described above and inserted between the contact members 152, 153 and the bottom walls 154 of the grooves 125, 126 until the tabs 161, 162 snap upwardly into the notches 177, 178 in the outer longitudinal edges 155, 156 of the contact members and thereby straddle these members and the backing members. When the retainers are being assembled with the wiping element, the latter is distorted so that it will cause the tabs to snap into place as they slide into the notches.

The ramps or tracks 167, 168 on the legs 158, 159 of the retainers extend upwardly into the end notches 175, 176 in the contact members 152, 153 so that their inner vertical edges may engage the sides of the notches 175, 176 and thereby assist in trapping these members in the grooves 125, 126 of the wiper element. The upper ends of the ramps 167, 168 are preferably so disposed that they will not in any way interfere with the relative longitudinal movement between the backing members. The longitudinal dimensions of the slots or notches 177, 178 in the contact members 152, 153 are made somewhat greater than the longitudinal dimensions of the tabs or abutment means 161, 162 on the retainers 157 and the longitudinal dimensions of the slots or notches 179, 180 are somewhat greater than the longitudinal dimensions of the embracing claws 141 on the inner ends of the yokes so that the contact members 152, 153 are free to move longitudinally relative to each other, to the backing members 150, 151 and to the retainers 157. Attention is also directed to the fact that the longitudinal spacing between the abutments 160, 161 and the ramps is such that the latter will not interfere with the relative longitudinal movement between the respective contact or antifriction members 152 and 153. It will be noted that the guide members 165, 166 on the retainers extend upwardly in longitudinal and straddling relationship with respect to the backing and contact flexor members.

Figure 9:
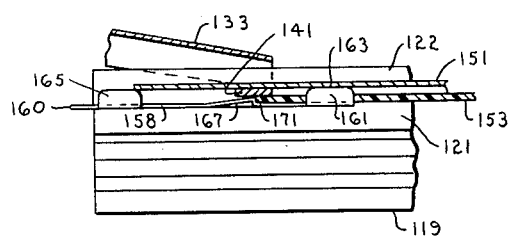
FIGURE 9 is an enlarged side view of one end of the blade with the claws of the pressure-applying superstructure in threaded position.

The secondary yokes are assembled with the wiping element after the flexor means and retainers are attached thereto and this is preferably accomplished by first inserting the embracing claws 141 on the inner ends of the yokes between the guides 165, 166 on the retainers and between the legs of the retainers and backing members as shown in FIGURE 9 until the claws engage the ramps 167, 168. Further inward movement of the secondary yokes along the blade will cause the embracing claws 141 to ride up the ramps 167, 168 to effect separation of the backing members 150, 151 and the contact members 152, 153, in order that the inturned portions of the embracing claws 141 can be readily slid therebetween and on further movement will engage the abutment means 161, 162 on the retainers 157 whereby to depress or retract the legs 158, 159 of the retainers with respect to the backing and contact members to effect a greater separation between these members, as depicted in FIGURE 10, and thereby afford clearance for continued passage of the claws toward the notches 179, 180 and so that the claws 140 on the outer ends of the secondary yokes can be slid between the guides 165, 166 for disposition between the retainers and backing members where they are held when the claws 141 flip into detachable interlocking relationship with the notches 179, 180.

The foregoing described structure affords an arrangement whereby the secondary yokes can be connected to the blade by merely moving them longitudinally into interconnecting operative relationship therewith without any prior manipulation of any of the components of the blade or yokes. The guide members 165, 166 on the retainers 157 assure proper alignment and piloting of the ends of the yoke into connection with the blade. After the secondary yokes are attached to the blade, the ends of the primary bridge 130 are connected in the regular way to the secondary yokes to provide a complete wiper blade assembly.

Figure 12:
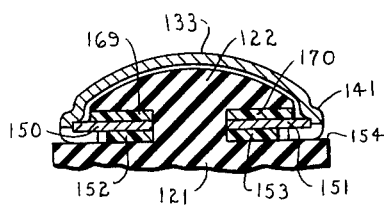
FIGURE 12 is a cross-sectional view showing a modified blade assembly in which the flexor means includes additional antifriction means whereby to further reduce friction between the flexor means and wiping element.

Under certain conditions, it is desirable to substantially eliminate, or to reduce to a minimum, all contact between the secondary yokes and the body of the squeegee member. FIGURE 12 shows a cross section of a wiper assembly in which elimination or minimizing of such contact is achieved. It will be noted that the flexible backing members 150, 151 are engaged directly by the claws 141 of the secondary yokes 133, and are contacted thereby, in sliding relationship, within opposed abutment means embracing a portion of the outer edge of the flexible backing members of the flexor means. It will be noted also that antifriction strips or contact members 152, 169, and 153, 170, respectively, are interposed between the flexible backing members and the body of the wiper element at each side thereof so that regardless of the direction in which the distortion or twist of the wiper element takes place (reversing as the direction of the travel of the blade on the glass is reversed), the force developed against the face of the flexible backing members is received upon the adjacent face of the interposed antifriction strip or contact member. Thus, as the blade follows the varying curvatures of the glass, the flexible backing members creep reversingly within the embracement of the two antifriction strips. This further minimizes frictional resistance to flexing—thus further contributing to maximum accommodation of the blade to the curvature of the glass through the full length of the blade and with a minimum of pressure required upon the blade from the wiper arm. Beyond the degree of wiper arm pressure desirable for resisting windlift, etc., it is not desirable to impose, for any reason, excessive pressure on the blade.

It will be noted in FIGURE 12 that the body of the wiping element embraced by the secondary yoke is spaced away from the yoke to avoid any contact between the body and the yoke—thus to avoid even a slight and normally negligible additional frictional resistance that would otherwise occur at that point.

For flat windshields or for windshields where the curvature is comparatively moderate, wiper blades of the general type shown in my U.S. Patent No. 2,596,063 have been found to be satisfactory, without antifriction strips such as embodied in the subject invention.

However, the sharper curvature found in windshields of more recent years has made it difficult, without such antifriction strips, to maintain contact with the glass throughout the full length of the blade as the blade approaches the extreme outside limits of the wipe pattern. It is a common experience, using blades not embodying the subject invention, to have the blades consistently skip or miss wiping the outside extreme of the wipe pattern lying under the outer end of the blade where latest "panoramic" or wrap-around windshields are to be wiped. When such ineffective blades are replaced with blades embodying the subject invention, more or all of the wipe pattern is wiped as the blade travels to and fro across the windshield. Within the scope of the claims of my said U.S. Letters Patent No. 2,596,063, variations of number of points at which pressure is distributed along the wiper blade have been undertaken, by varying the number of pressure-distributing members embodied in the pressure-distributing assembly, in an effort to hold down the outer end of the blade around sharp curvatures so that a clean wipe could be achieved across the entire wipe pattern. These more complicated pressure-distributing assemblies have largely defeated their own purpose because they have added additional parts and additional frictional contacts, rather than decreased the frictional resistance to the flexing of the blade. In some arrangements of parts in pressure-distributing devices in which the pressure adjacent the ends of the blade has been kept substantially independent of the pressure applied in the middle of the blade, the percentage of the total arm pressure required to bring the blade in contact with the windshield has left available to the middle of the blade a lower pressure which permits earlier windlift, skip wipe, and streaking. The subject invention preserves the original principle of proportionate arm pressure distributing a substantially equal amount of the total arm pressure respectively to each one of the ends of the secondary yokes.

In some instances where blades are for original equipment of the more costly type of cars, and even in some instances for less costly cars, engineers for the vehicle manufacturers are inclined at times to endeavor to eliminate or minimize the possibility that noise will be created by the blade in its operation, as in collisions or contacts between the secondary yokes and the flexble backing members 150, 151 of the flexor means. In such instances, where the importance of eliminating noise is held to be deserving of precedence over the other considerations herein mentioned, a construction similar to that shown in cross section in FIGURE 3 of Patent No. 3,041,654 may be used, wherein the secondary yoke is disposed to contact, with a predetermined degree of pressure, the upper or back portion of the resilient wiping element, such contact to serve as a noise damper.

Thus, it will be seen that the subject invention lends itself well to modifications of design and arrangement to meet varying requirements and particular conditions, without departure from the invention's basic improvements in means for minimizing frictional resistance to flexure of the blade.

When it becomes desirable to replace any one of the above-enumerated blades or their equivalents due to deterioration or the like, it is a simple matter to remove the primary bridge from the secondary yokes as above described and then apply pressure downwardly on the outer edges 155 of the contact members 152, 153 to spread the contact members from the backing members 150, 151 to release the embracing claws 141 from the notches 179, 180 so that the yokes can be reversibly moved toward the respective ends of the wiping elements and separated therefrom. In this act of separation, the claws 140 are separated from the retainers in advance of the claws 141 and the claws 141 are released by passing over and depressing the abutments 160, 161 on the retainers.

Once the rubber wiper element has the flexor means 112 with the retainers 157 in operative position and assembled therewith, the blade element is produced which becomes a separate and complete article which can be sold as such or assembled with a superstructure and sold. The blade element can be manufactured, stored, shipped, and sold either in combination with a pressure-applying superstructure or alone as a refill or replacement item.

Having thus described my invention, it is obvious that various other modifications may be made in the same without departing from the spirit of my invention; hence, I do not wish to be understood as limiting myself to the exact forms, constructions, arrangements, and combinations of parts herein shown and described.

I claim:
1. A windshield wiper blade comprising an elongate resilient wiper element having sides provided with longitudinally extending grooves therein,
    flexible means having separate longitudinally extending portions disposed in said grooves,
    abutment means provided on and adjacent an extremity of said flexible means, and
    a member disposed at said extremity of said blade and having a pair of longitudinally extending portions disposed in said grooves and provided with an abutment held in engagement with said abutment means by the inherent resiliency of said element for maintaining said member in assembled relationship with said blade and said extending portions of said flexible means in said grooves.
2. In a windshield wiper having an elongate blade including a back portion and a wiping portion and further including grooves on either side of the blade between the back and wiping portions extending substantially throughout the length of the blade
    means having portions disposed in the grooves permitting flexure of the blade generally in a plane toward a surface to be wiped,
    and pressure-transmitting means connected to the wiper at spaced-apart locations,
    the improvement comprising:
    a generally U-shaped member having legs disposed substantially in the same plane for reception respectively in the oppositely disposed grooves and adjacent the first-mentioned means, and
    said member having abutment means thereon adapted to engage abutment means on the first-mentioned means and be linearly restrained therewith, said member also having means adapted to receive and interlock with a portion of the blade whereby to prevent relative longitudinal movement between said member and said blade.
3. A wiper having a wiping edge and longitudinally extending laminar portions disposed in parallel relation to said edge and so constructed that the wiper has greater flexibility in its longitudinal plane of symmetry than at right angles thereto, at least one of said portions being of a nonmetallic material.
4. An elongate fitting of the kind described comprising a substantially U-shaped body having parallel substantially planar side portions joined by an end portion, said side portions having a pair of lugs upstanding therefrom at each extremity of said fitting, and said side portions also having a pair of abutments located between said pairs of lugs.
5. A substantially U-shaped fitting adapted for attachment to a resilient wiper element provided with abutment means, said fitting comprising a pair of parallel side portions joined together by an end portion, and said side portions having inner notched edges defining an opening for receiving the abutment means when the fitting is correctly applied to the element with its side portions straddling the element.
6. An elongate wiper element comprising a resilient body having an upper surface and an elongate wiper portion disposed in parallel relation to said upper surface, said element being provided with longitudinally extending means located between said wiper portion and upper surface for receiving elongate supporting means for the element and with a formation disposed at one of its ends and adjacent said longitudinally extending means, and a member having portions disposed in said receiving means and provided with means receiving said formation for holding said member in relation to said element.
7. An elongate resilient wiper element having an upper longitudinally extending surface, a pair of longitudinally extending side surfaces, and a lower longitudinally extending wiper edge disposed in spaced parallel relation to said upper surface, each of said side surfaces being provided with a longitudinally extending groove terminating short of the ends of the element to provide an abutment at each end of each groove, a fitting carried by each end of said element, at least one of said fittings being provided with means receiving the abutments at one end of said element for holding this fitting connected to the latter.
8. In combination: a windshield wiper blade assembly comprising an elongate resilient wiper element provided with longitudinally extending receiving means terminating short of the ends of the element and a longitudinally extending wiper edge disposed in parallel relation to said receiving means, elongate flexible means disposed in said receiving means, abutment means provided adjacent one end of said flexible means, and means connected to said element and engaging said abutment means for holding said flexible means in said receiving means, and additional abutment means provided on said flexible means at a location spaced inwardly from said first-mentioned abut- ment means for engaging a component of a pressure-distributing device for holding the latter in relation to the blade assembly.

References Cited by the Examiner
UNITED STATES PATENTS

| | | | |
|---|---|---|---|
| 109,580 | 11/1870 | Bradley et al. | 24—138 |
| 1,968,060 | 7/1934 | Utiger | 24—126 X |
| 2,596,063 | 5/1952 | Anderson | 15—250.42 |
| 2,697,241 | 12/1954 | Oishei | 15—250.42 |
| 2,781,539 | 2/1957 | Oishei | 15—250.42 |
| 2,782,443 | 2/1957 | Krohm | 15—250.42 |
| 2,787,447 | 2/1957 | Anderson | 15—250.42 |
| 2,983,945 | 5/1961 | De Pew | 15—250.42 |
| 3,041,654 | 7/1962 | Anderson | 15—250.42 |

CHARLES A. WILLMUTH, *Primary Examiner.*